July 14, 1970 G. BORGHI 3,520,581
CABINETS FOR REFRIGERATORS AND THE LIKE
Filed Feb. 21, 1968 9 Sheets-Sheet 8
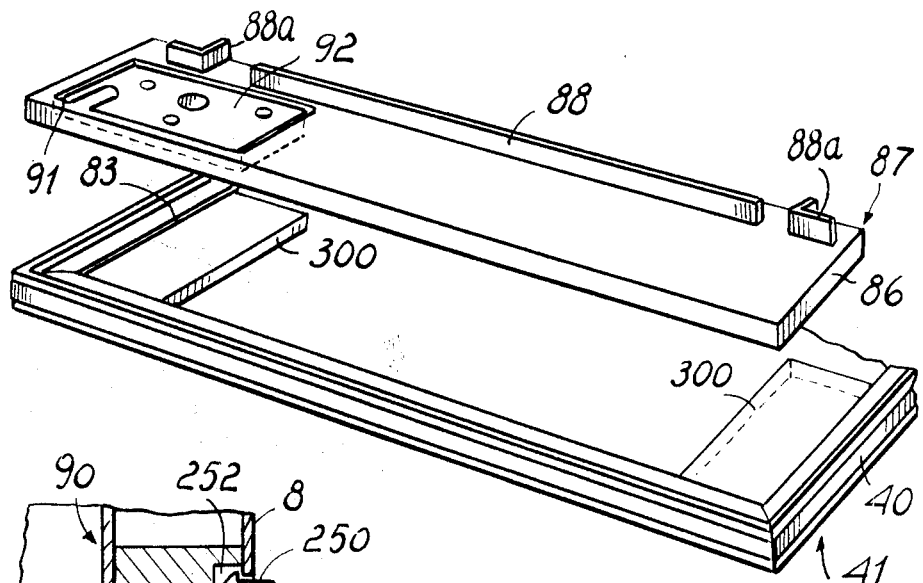
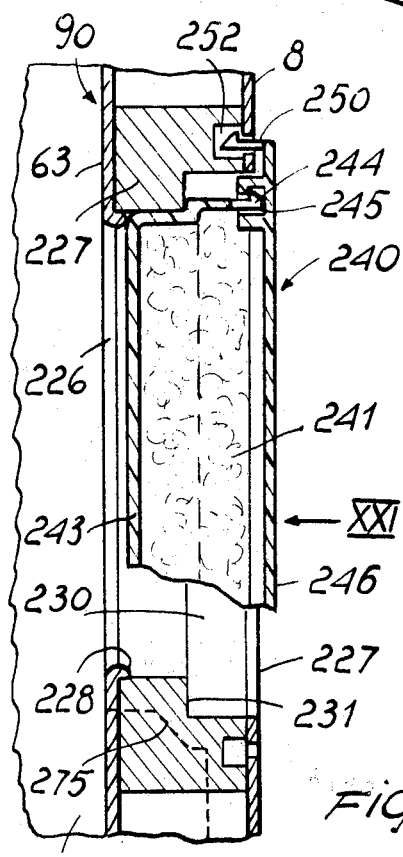
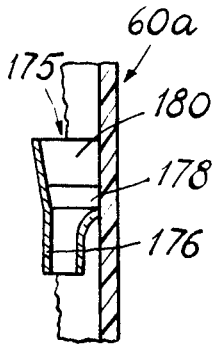
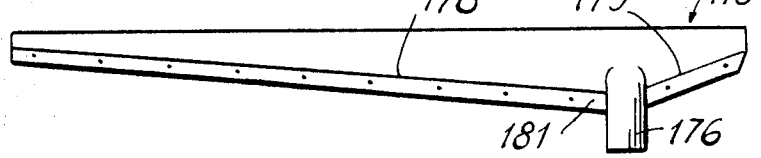
INVENTOR
GIOVANNI BORGHI
BY Steinberg & Blake
ATTORNEYS July 14, 1970 G. BORGHI 3,520,581
CABINETS FOR REFRIGERATORS AND THE LIKE
Filed Feb. 21, 1968 9 Sheets-Sheet 9

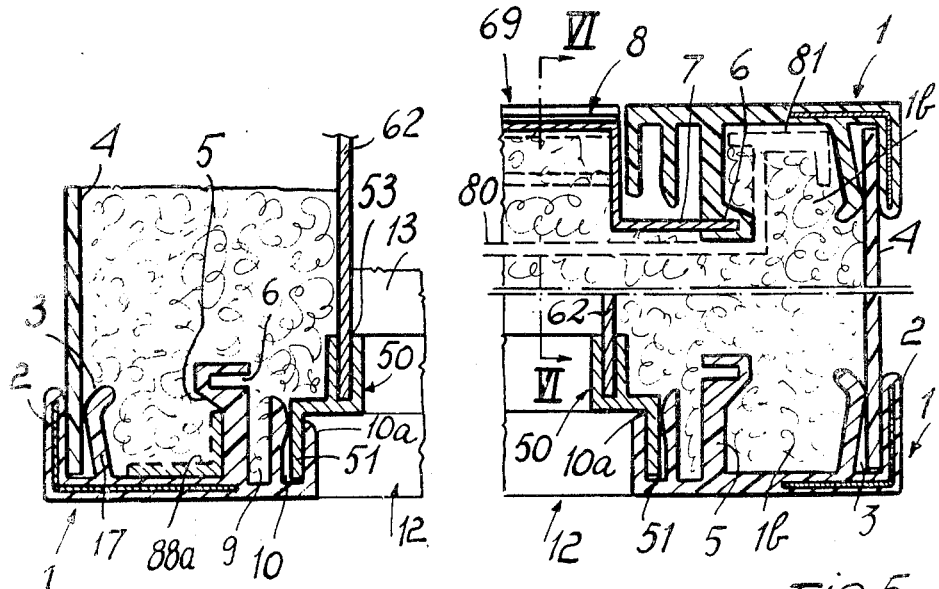
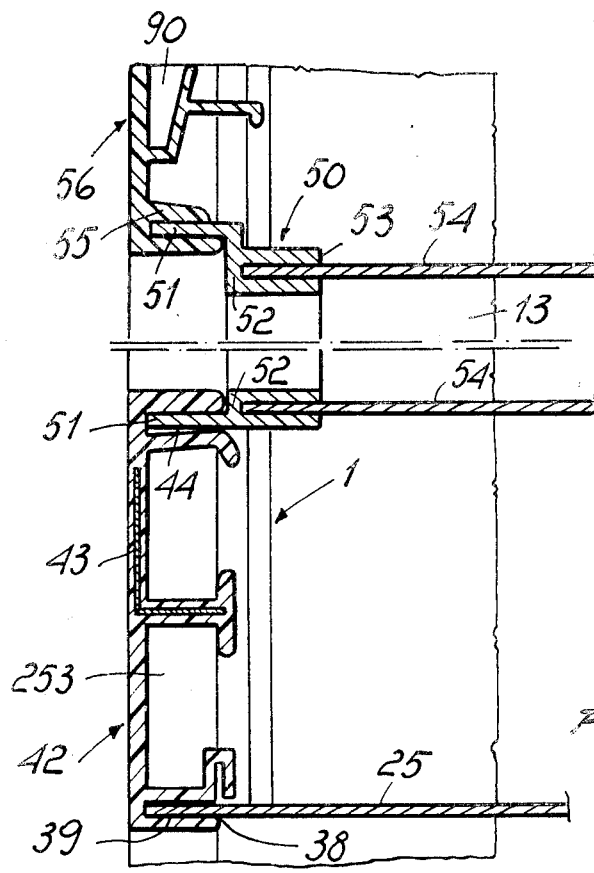

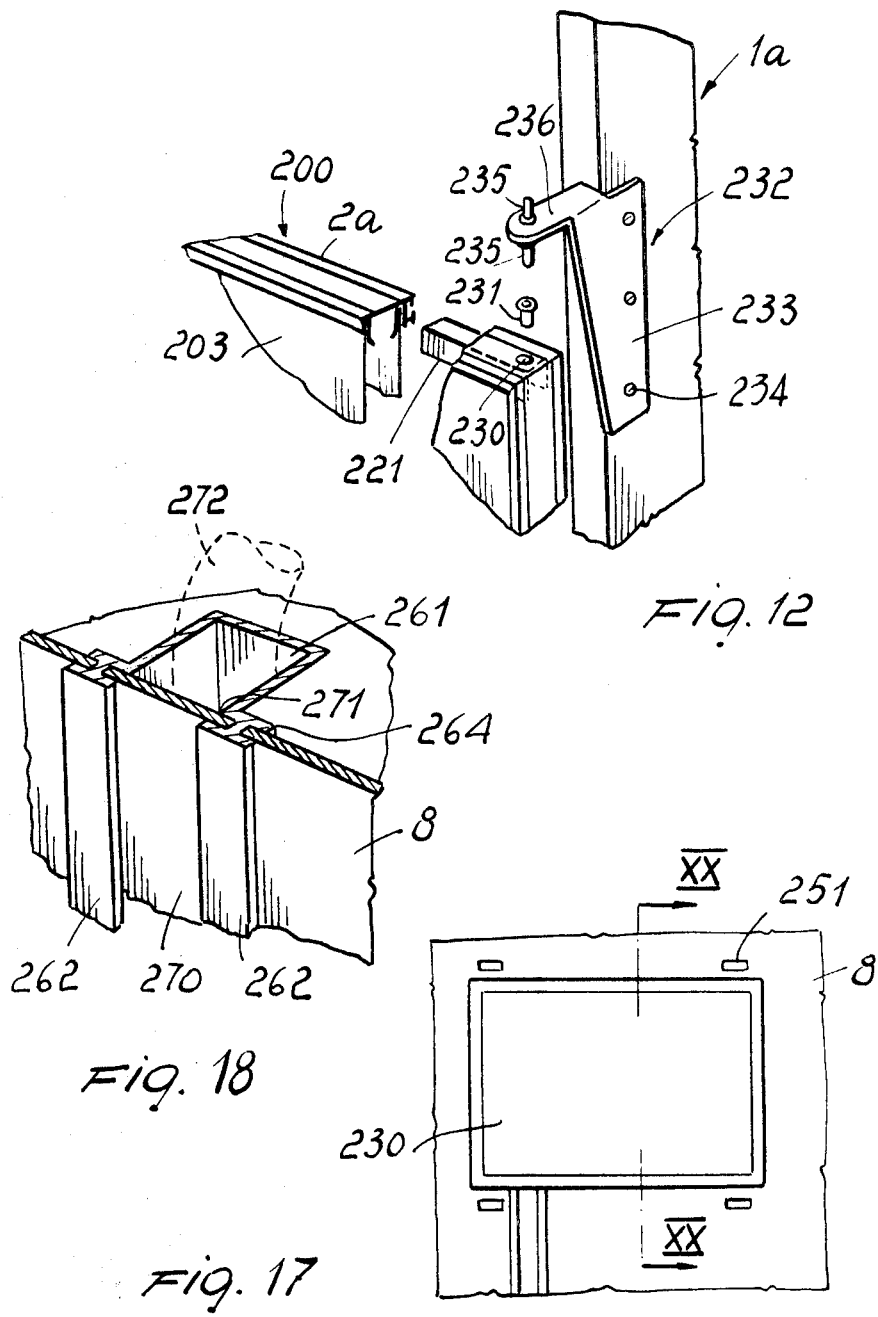

INVENTOR
GIOVANNI BORGHI
BY Steinberg & Blake
ATTORNEYS

United States Patent Office 3,520,581
Patented July 14, 1970

3,520,581
CABINETS FOR REFRIGERATORS AND THE LIKE
Giovanni Borghi, Comerio, Varese, Italy
Filed Feb. 21, 1968, Ser. No. 707,212
Claims priority, application Italy, Mar. 6, 1967,
13,372/67
Int. Cl. F25d *23/00*
U.S. Cl. 312—214                                        6 Claims

ABSTRACT OF THE DISCLOSURE

A cabinet for a refrigerator or the like. The cabinet includes edge frame sections formed with outer and inner grooves which are parallel to each other. Flat panels are received at their edges in the outer grooves while one or more shaped bodies, which define the interior refrigerated chambers, have edges received in the inner grooves. These shaped bodies and the panels define between themselves gaps into which a foamable, thermally insulating plastic is injected to fill the gaps and thus provide therein the required thermal insulation, this insulation also acting as an acoustic insulation.

---

This invention relates to furniture such as refrigerator cabinets obtained by injection (within a gap as defined by two or more shells) of a per se already known expansible synthetic material, such as polyurethane resin, which expands within the gap creating by its setting a monolithic body or structure involving such shells.

A particular, even though non-exclusive field of application for the method according to the invention is that involving the production of refrigerating cabinets, freezers, preservers, deep-frozen product counters, washing-machines, ranges, ice-producing machines and other similar products.

A method is known consisting of providing refrigerating cabinets and the like by injecting within the gap between a body or shell defining the internal space and an external body or shell and expansible synthetic material, such as polyurethane resin, which when expanded and cured will join the two bodies or shells together, creating a mechanically resistant and thermally insulated monolithic structure.

Generally, the known approaches contemplate the use of external and internal sheet shells substantially of a tank or basin shape, that is essentially continuous, whereby the refrigerating cabinet thus obtained will appear as regular, rigid and without any personality, not succeeding therefore in matching with the almost always different style of the other kitchen furniture. Therefore, one of the objects of the present invention is to provide a structure giving personality products, that is capable of accommodating the most different styles without resorting, however, to handicraft techniques (of a high cost due to low productivity), but to mass production techniques.

The conventional approaches, utilizing shaped sheet shells, are related to high costs as to the apparatus for pressing or stamping such shells. Instead, this invention proposes a structure which can be made by extremely simple and economical apparatus.

Another object of the present invention is to provide a structure allowing to obtain refrigerating cabinets and similar furniture, wherein the use of metal (hence a good heat conducting material) is minimized, whereby, the other conditions being unaltered, a more effective thermal insulation can be obtained with a reduced use of insulating material.

Another significant object of the invention is to provide a structure having an accurate spacing and positioning of the parts making up the cabinet, prior to expansible material injection, without it being required to resort to jigs or precision apparatus.

A still further object of the present invention is to provide a piece of furniture, such as a refrigerating cabinet, of the type wherein the component elements are firmly joined to one another by expanded or foamed material, in which the external shell is formed of preferably flat panels, such as of plastic laminate, which are capable of distinguishing the piece of furniture because of the colour, design, or the like.

A still further object of the present invention is to provide a piece of furniture comprised of elementary portions and outlines, to which the task of retaining, spacing and guiding such elementary portions is allotted, which aids in generally furniture assembling and production.

Substantially, the present invention aims to simplify the furniture construction, which furniture can be made in an extremely rapid manner, without any high wastes of labour or equipment, hence with substantial economical advantages, without it being prejudicial to the features of strength and functionality which, on the contrary, form the essential quality of the furniture according to the teaching of the present invention.

According to the invention, the structure includes frames formed of sections provided with grooves, at least one shaped member having edges at least partially received in such grooves, preferably flat panels having edges in different grooves of said sections, as spaced apart from the aforesaid shaped member, said panels forming at least part of the outer cabinet surface, and in the gap between said member and said panels an expansible material which on expanding and setting will block and join said panels, sections and member to one another.

According to a useful embodiment of the invention, the sections provided with parallel and spaced apart grooves form a pair of substantially U-shaped frames, at least a pair of shaped members of thin metal plate, one of which members forms the inner cabinet surface, whereas the second of which forms part of the base, the two members being so arranged that they will directly or indirectly engage within the grooves in the frames, so as to hold them at a given spacing from one another, flat panels in the frame grooves, said panels having edges being preferably of plastic laminate and intended to form the outer cabinet walls, and injected into the gap between said two members, as well as between the same and the external shell, the expansible plastic material though at least one introducing inlet, so that an acoustically and thermally insulated monolithic structure is obtained by setting or curing as a result of its expansion.

More particularly, where two shaped members are used, one of which defining the inner furniture surface and the other of which defining the base thereof, it is provided that a gap will remain in communication with the gap between said members and the external shells as specified by the U-shaped frame and the panels threaded therein, so that the foam layer involving the gap also extends between said two members and thermally separates the same.

A piece of furniture according to the preferred embodiment of the invention is essentially characterized by comprising: side panels formed each of a frame made by a section provided with guiding grooves, a set of panels defining the furniture sides as threaded in some of said guiding grooves, at least one pair of members preferably made of sheet and intended to be weakly joined to said frames, directly or indirectly, by threading in different guiding grooves spaced apart from the first mentioned guiding grooves, said members being retained at a spaced relationship from one another, so that a gap is provided therebetween, a cover member intended to define said piece of the furniture at the top and provided with an outline section wherein the upper ends of the panels insert and which is spaced apart from said members, and a layer of foam acting as a binder and filling the gaps between the parts or elements making up the piece of furniture.

The invention will be better understood from the following detailed disclosure, given by mere way of example and thus of no limitation, of some particular embodiments thereof, as shown in the accompanying drawings, in which:

FIG. 3 is an enlarged cross-sectional view of the evaporating coil as applied to the wall of the preservation chamber, said sectional view being taken on line III—III of FIG. 1;

FIG. 4 is a sectional view taken on line IV—IV of FIG. 1;

FIG. 5 is a sectional view taken on line V—V of FIG. 1;

FIG. 7 is a sectional view taken on line VII—VII of FIG. 1;

FIG. 12 is a fragmentary perspective view showing the detail relating to a hinge for the refrigerating cabinet doors of FIG. 9;

FIG. 13 is a front view of the gutter intended for being applied in the so-called wet wall type of refrigerators, such as that shown in FIG. 9, and serving to drain condensate water away;

FIG. 14 is a sectional view of the drain of FIG. 13 after application thereof to the wall partially shown of the refrigerator of FIG. 9;

FIG. 15 is a fragmentary perspective exploded view showing the detail of the cantilever portion of the upper side of the refrigerator as shown in sectional view in FIG. 8;

FIG. 16 is a sectional view according to line XX—XX of FIG. 17, and said FIG. 16 shows how the rear aperture is closed for a refrigerator comprising an evaporating cell within the preservation chamber;

FIG. 17 is a view in the direction of arrow XXI of FIG. 16;

FIG. 18 is a perspective sectional view showing the detail of the conduit in the rear wall of the refrigerator of FIG. 17.

Figure 1:
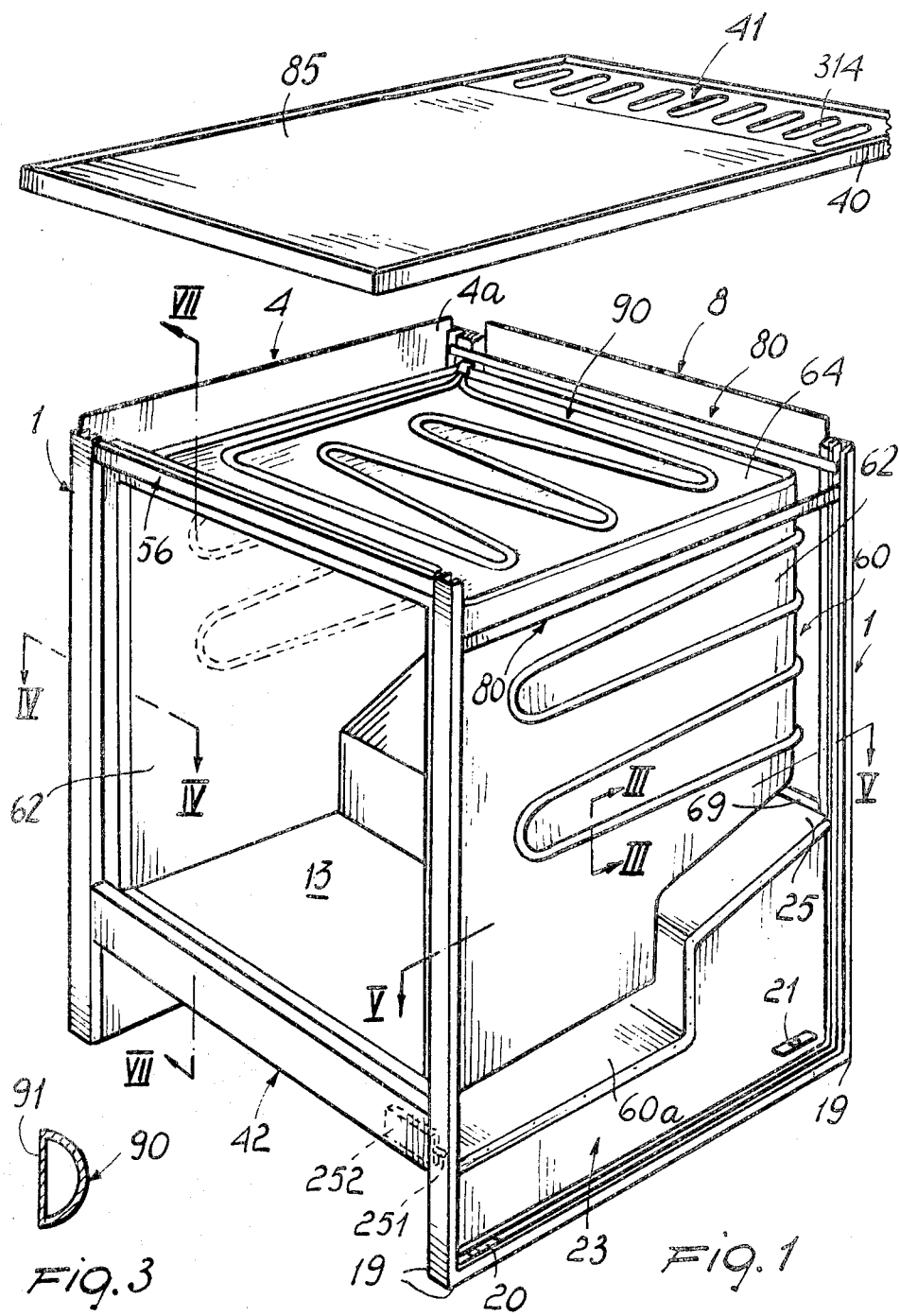
FIG. 1 is a fragmentary perspective view, with some portions being omitted, showing a small refrigerating cabinet, the preservation chamber of which reaches considerably low temperatures, whereby it has to be provided with a relatively substantial insulating thickness.

It is suitable to state in advance that the technique of injecting a foamable resin, such as a polyurethane resin, in order to obtain a thermal insulation of refrigerating cabinets is a known technique, as well known are the foamable materials being used. It is therefore deemed useless a description thereof, as the same can be found in various patent publications.

Referring to FIGS. 1, 2, 3, 4, 5, 6, 7 and 8 of the appended drawings, the refrigerating cabinet therein shown substantially comprises a pair of U-shaped frames, designated at 1, defining in the instant example the side panels for the refrigerator, and comprising a multi-grooved section, the sectional view of which is particularly shown in FIG. 4.

Preferably, frames 1 are made of reinforced plastic material, that is incorporating a ferromagnetic metal core 2, acting to allow the adhesion of the usual well-known magnetic seal which is attached alongside the outline of the cabinet door (not shown) and having the purpose of retaining the door closed.

By using such sections two advantages would result: the advantage of substantially reducing the heat passage due to the plastic material coating, and that of affording the "setting" of the magnetic seal.

At its outer side said section 1 has a first groove 3 with a resiliently enlargeable narrow mouth, so that once inserted therein a panel 4 is resiliently retained by the sides jointly defining said groove. Section 1 has also an intermediate rib 5 having at the end substantially at right angles to the longitudinal extension of section 1 a groove 6, the mouth of which being also narrow, in which the vertical edge 7 of a panel 8 rearwardly defining the refrigerating cabinet is intended to be received (see FIG. 5).

Additionally, section 1 comprises a pair of grooves 9 and 10 parallel to each other, located at the inner section end beyond metal insert 2. The innermost of such grooves (groove 10) is designed to accommodate the edge 51 of a frame 50 as obtained by plastic material molding and on the front defining the aperture through which the refrigerator preservation chamber 13 is accessible. In the modified embodiment shown in FIG. 8, the aforesaid groove is, as better explained hereinafter, for directly accommodating the vertical front sides of a shaped body, designated as a whole at 15, and defining the preservation chamber 13.

At the inner section of each of the U-shaped frames, namely at the groove between ribs 5 and 17, blocks 20 are inserted adjacent the lower corners 19 of frame 1, said blocks having a central threaded hole 21 and after set injection of the foamable resin being used for the threading of usual screw adjustable feet, through which the refrigerator rests on the floor.

The refrigerator also comprises a first shaped body of thin metal sheet, indicated as a whole at 23, which is fire painted on the two faces and forms the refrigerator base. Base 23 is substantially comprised of three plate elements, two side panels 24 and a cross element 25. Cross element 25 has an intermediate step 26 and is inclined along the final length. The three plates forming the base 23 are joined together without welding by a simple U-edging of the upper contour 30 of side panels 24 and, following the insertion of the contour or edge of plate 25, by distortion at discrete areas of the overlapping plate layers.

Sides 35, 36 and 37, indicating the lower and vertical edges of base 23, are inserted in groove 10 of the section forming said frames 1.

The U-edges 30 are interrupted adjacent the ends of side panels 24. Hence, the connection between the several plates 24, 25 does not involve the front and rear corners of body 23. Additionally, as shown at 37a (FIG. 2) cross plate 25 is partially broken away so as to allow the passage for rib 10a of section 1. A similar solution is provided, of course, also on the rear of body 23. This solution affords the vertical edges 35 and 37 of body 23 to be threaded within grooves 10 of frames 1, the front and rear edges 38 within the front and rear cross-pieces 42 and 69, respectively, without any need for interrupting the section ribs 10a.

Between the side panels 24 of base 23 and panel 4, preferably made of plastic laminate and inserted by three of its sides in the outer groove 3 of section 1, a gap is provided wherein the per se known foamable synthetic material will solidify and set and which, according to also known techniques, is injected through at least one aperture 71 in rear panel 8.

Flat panels 4, defining the two opposite external side panels for the cabinet, are of a longitudinal length larger than that for the vertical sides of U-shaped frames 1, as clearly shown in FIG. 1, where such projecting areas are indicated at 4a. As explained hereinafter, such projecting areas are designed to enter a narrow mouth groove in section 40 surrounding the top side 41 of the refrigerator, which top side is the cover member for the cabinet according to the invention.

Front edge 38 of base 23 is designed to be accommodated (FIG. 7) within a narrow mouth groove 39 on a side of section 42, acting as a lower cross-piece for the refrigerating cabinet. This section also has a ferromagnetic material insert and core 43 of a U cross-section, the function of which is to allow adhesion for the magnetic seal of the refrigerator door. At the opposite side, said cross-piece 42 additionally comprises a second narrow mouth groove 44, the function of which is to be described hereinafter. In order to allow a ready and accurate positioning for said cross-piece 42 along the front uprights of frames 1, a hole (involving said rib 10a) is pierced in such uprights at a predetermined level, wherein a pin 251 is inserted (see FIG. 1) and projects from a block 252 slidably inserted within a groove 253 of cross-piece 42 (see FIG. 7).

The refrigerator being described is of a type wherein its preservation chamber 13 is maintained at a very low temperature. Typically, such a refrigerator is a small preservator for deep-frozen products; accordingly, its preservation chamber 13 has to be insulated from the outside by a relatively substantial thickness of material, whereby resort is made to the above frame 50 (FIGS. 4 and 5), acting to increase the spacing between the outer side panels 4 and the walls of chamber 13.

Frame 50 is a plastic material molded member and on three sides thereof has the section as shown at the top of FIG. 7, while having at the lower side a section as shown at the bottom of said figure, which section differs from the former only by a less high step 52. On the front, said frame 50 has a flange 51 and step 52 acting as a transient area between flange 51 and a groove 53 designed to accommodate the front edge 54 of a shaped plate body 60 (FIG. 2) defining said preservation chamber 13. At its lower side, said flange 51 is designed to be received within groove 44 of cross-piece 42, whereas the two vertical lengths of said flange are designed to be housed (see FIGS. 4 and 5) within grooves 10 of side panel frames 1; instead, the top side of the frame is accommodated within a narrow mouth groove 55 in a section 56 forming the upper cross-piece for the refrigerating cabinet.

The four edge sides 54 for the plate body 60 are made as the front and rear corners 37 and 35 of base 23; that is, the connecting channels 65 are interrupted prior to the corners and in the upper and lower walls 64 and 61 of body 60 there are provided recesses 61a similar to 37a. The embodiment allows the edges of the front aperture of body 60 to be threaded within grooves 53 of frame 50, or (according to the embodiment of FIG. 8) directly within grooves 44 and 55 of the two cross-pieces 42 and 56 and grooves 10 of the front uprights for frames 1.

Body 60 includes a bottom plate 61 (the shape of which matches with that for the upper wall 25 of base 23), two side panels 62 forming a unit with rear wall 63, and an upper plate 64. These walls (or plates) are joined to one another similarly as for base 23; that is, bottom and top plates 61 and 64 are provided with a channel-shaped contour flange 65, wherein the contour of plates 62, 63 is seated and which is embedded by discretely providing distortions involving the overlapping metal layers or plies.

The outer rear wall of the cabinet is defined by the above cited plate panel 8. Along the vertical sides said panel 8 has steps 7 and, as previously stated, the ends of such steps are inserted in the narrow mouth grooves 6 of the sections forming said frames 1. The lower edge 67 of said rear panel 8 (see FIG. 6) is inserted in a narrow mouth groove 68 of section 69 forming the single rear cross-piece for the structure according to the invention. In a groove 70 normal to groove 68 said section 69 accommodates the rear end of the cross plate 25 of base 23. An aperture 71 is provided at the rear wall 8 and is for introducing the foamable resin into the gap 60a between members 60 and 23, and between these members and the external shell of the refrigerator, said shell being defined by cross-pieces 42, 56 and 69, eventual frame 50, frames 1, panels 4 and 8, and cover member 41 to be discussed about hereinafter. More particularly, as shown by FIGS. 4 and 5, a gap is provided between panels 4 and walls 62 of member 60. A similar gap is provided between bottom wall 63 of chamber 13 and panel 8, since the depth for member 60 is suitably designed for a proper spacing. Additionally, the gap extends between said members 23 and 60 at walls 25 and 61 having substantially the same configuration. Finally, as described hereinafter, said gap extends between the upper wall 64 of member 60 and cover member 41.

Figure 9:
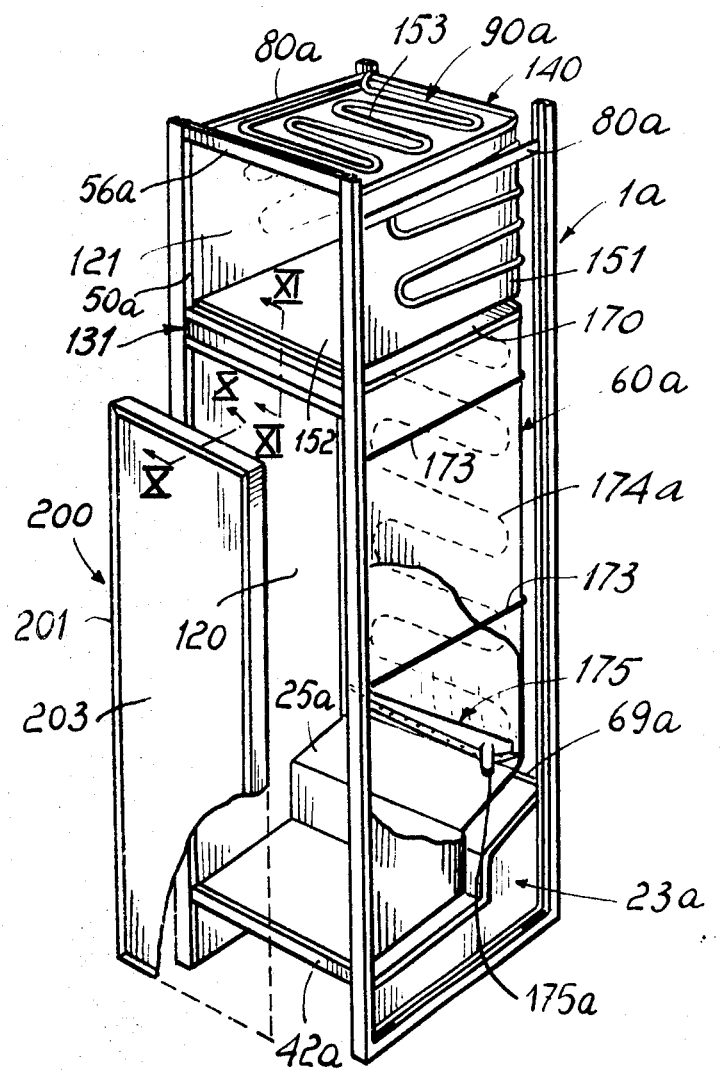
FIG. 9 is a perspective view, in which some parts have been omitted and others broken away, showing a so-called two-door type of refrigerator.

As from the foregoing description, member 60 is connected to the structure formed by frames 1 and cross-pieces only at its front edge 54. Hence, in order to insure that a proper gap is maintained between said members 23 and 60, spacers (not shown) are interposed between such two members, the spacers being of a material consistent with the foam being produced and set within the gap; such a material could be formed of already set blocks of foamable resin identical to that being injected, such as a polyurethane resin. However, to retain member 60 at a proper position suitable tapes are preferably used, such as tapes 173 of FIG. 9, surrounding member 60 on three sides and located with the enlarged ends thereof in grooves 1b of sections 2 of frames 1.

Metal tie rods 80, terminating with substantially T heads 81 which, as shown in dotted lines in FIG. 5, are inserted in the central groove 1b of sections 1, are used both on the side panels and at the rear end and any other locations (not shown) to hold in an assembled condition the various elements weakly joined by threading of wall edges into grooves.

The cabinet is completed by the cover member 41, comprising a contour section 40 (see FIG. 8) at the bottom having a narrow mouth groove 83 and a second groove 84 at right angles thereto. The contour or edge of panel 85, such as of plastic laminate, is inserted in this groove 84. Obviously, the frame is constructed so that it can be opened at a corner or a side for affording this introduction. Flange 86 of a preferably metal member 87, particularly shown in FIG. 15, is inserted in said groove 83. At the bottom said member 87 and a discontinuous flange 88 formed of three portions, a straight intermediate portion and two mutually normal side portions 88a. Portions 88a are designed for threading in the open upper ends of the front uprights for frames 1, there occupying the position as illustrated in dotted lines in FIG. 4. On the contrary, flange 88 is designed for insertion in the upper groove 90 of cross-piece 56.

In member 87 a housing 91 is formed, in which a metal plate 92 is inserted, the form of said metal plate 92 corresponding to the space which, following injection, is occupied by a plate carrying the door pivoting pin and which is secured by screws threaded in threaded holes in an underlying plate 300 inserted in the grooves of section 40. Two plates 300 are effectively provided for avoiding distortions in the projecting portion of cover member 41. For locating the fastening screws for the plate carrying the pivoting pin, in member 87 references are provided in the form of weakening areas, not shown in FIG. 15.

Adjacent its rear end, cover member 41 has a section 311, in turn having a groove 312 (FIG. 8) coplanar to groove 84 of section 40 and in which plate 85 terminates; a second groove 313 perpendicular to the former and accommodating the upper edge of panel 8; an area having an aperture 314 for air circulation; and finally an edge 315 inserting in groove 84 of section 40. The open upper ends of frames 1 are suitably sealed by adhesive.

Figure 10:
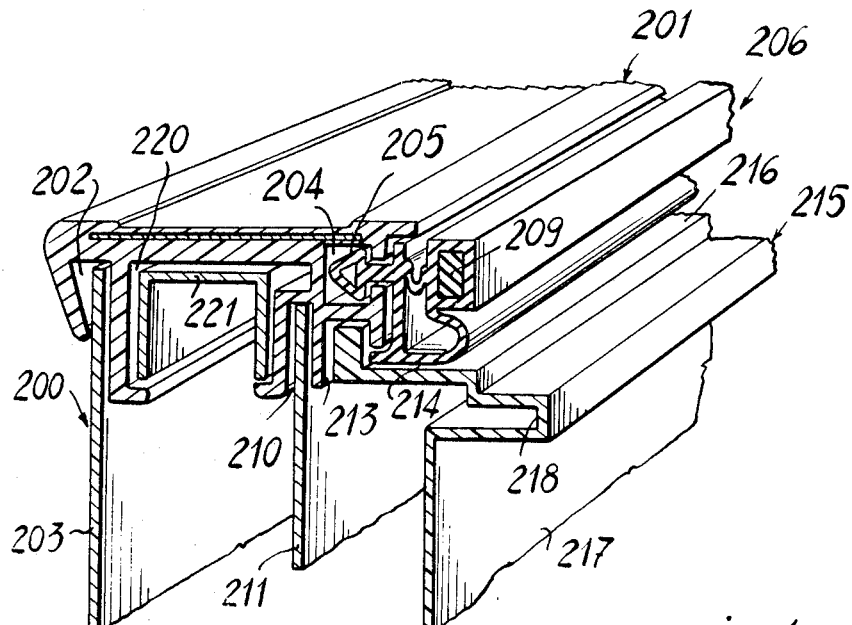
FIG. 10 is a perspective sectional view of a detail for the refrigerator door of FIG. 9, such a detail corresponding to line X—X of said figure.
Figure 11:
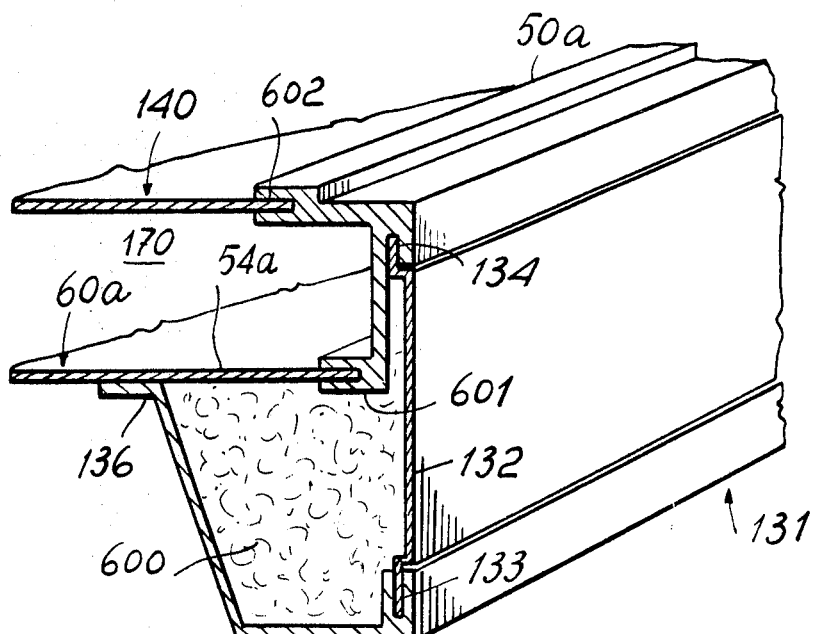
FIG. 11 is a perspective sectional view of a detail corresponding to line XI—XI of FIG. 9.

As it will be seen from FIG. 1, the upper wall 64, and the walls 62 and 63 of member 60 are contacted by coil 90 making up the evaporating battery for the refrigerating circuit which, as well known, is completed by a condensing battery engine-compressor located outside the cabinet, such as in the space under base 23. Particularly, said compressor can be carried within said space on cross-pieces which are attached to the side panels, while the condensing battery (the location and construction of which are not concerned with the present invention) can be attached to the rear uprights of frames 1 by means of screws and spacers. As to the refrigerating cabinet door, it can be made according to conventional techniques, or by using again the technique for injecting foamable synthetic materials, as described and shown for the embodiment of FIGS. 9 and 10 to be discussed hereinafter.

Figure 8:
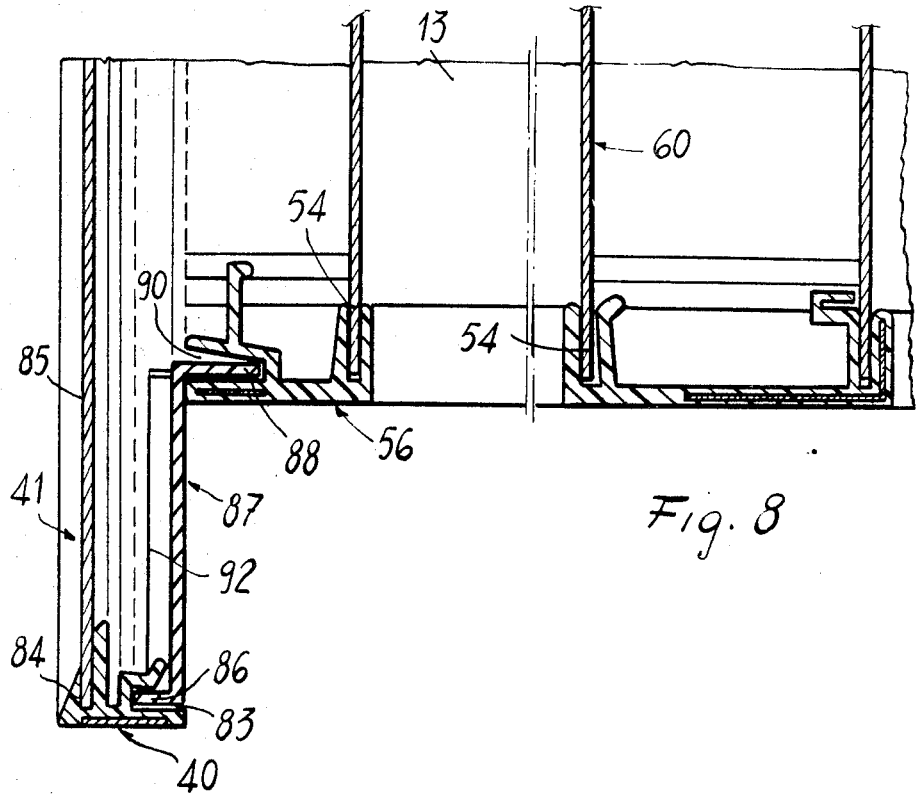
FIG. 8 is a sectional view substantially corresponding to line VII—VII of FIG. 1, but showing a refrigerator wherein the temperature should not reach very low values, thereby requiring a less thick thermal insulation.

In the embodiment shown in FIG. 8, and relating to a refrigerator in which the insulation about the preservation chamber 13 is of a less thickness, no use is provided for frame 50; the edges 54 of member 60 (which in this case is apparently of larger size) are directly threaded in the grooves of the sections, which in the embodiment of FIG. 7, were taken by flange 51 of frame 50. As to the remainder, this modified embodiment corresponds exactly to the embodiment of FIGS. 1–7.

According to a specific feature of the invention, as shown in FIG. 3, the coil 90 forming the evaporating battery contacting member 60, is of a semicircular cross-section with a flat side 91 caused to adhere against the walls of member 60, being attached thereto by adhesive tapes, not shown, prior to foam injection step.

Figure 19:
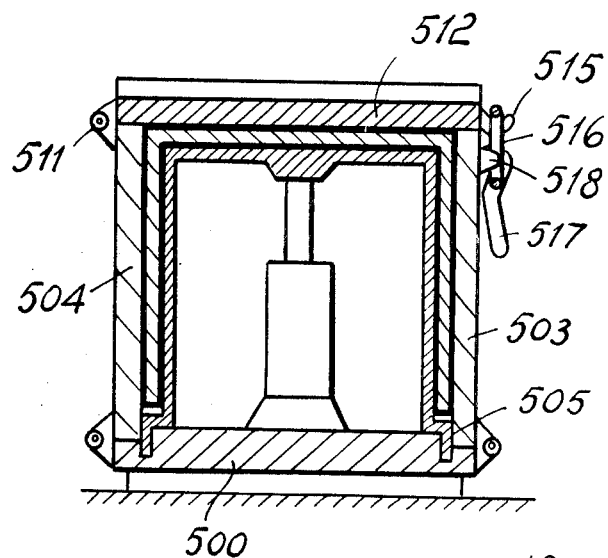
FIGS. 19 and 20 are diagrammatic sectional views showing the refrigerator supporting apparatus and the location wherein the expansible polyurethane resin is injected.
Figure 20:
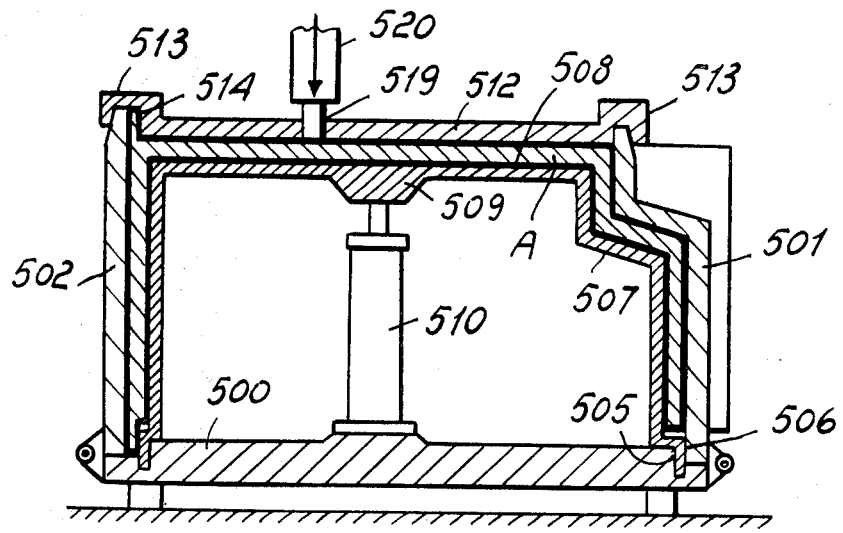

This cabinet forming a movable structure, as it may be very readily decomposed in the elements making up the same, is mounted after assembling in the apparatus shown in FIGS. 19 and 20. In these figures the cabinet is indicated at A. The apparatus includes a base 500, four plates 501, 502, 503 and 504, at the bottom pivoted at base 500, located at an angle of 90° to one another and shaped so as to be applied against the sides facing the refrigerator outside.

Base 500 has a continuous groove 505 wherein there is inserted the contour edge 506 of an annular or endless body 507 which is applied against the inner sides of the refrigerator preservation chamber, except the bottom side or face 508 against which a plate 509 adheres as mounted at the end of a jack 510 serving as an ejector and which is attached to base 500. A cover 512 is hinged to plate 504 at 511 and on two sides is provided with lugs 513 having grooves 514 on which the upper beveled ends of plates 501, 502 seat. Cover 512 is provided with hooks 515 on which a ring 516 is arranged and connected to a manual clamping lever 517 hinged to plate 503 at 518. In cover 512 there is provided a channel 519 through which a per se known injection head 520 supplies the foamable resin to the cabinet gap. It should be kept in mind that plate 501 will have such shape as to adhere against the lower side of chamber 25, the inner sides of side panels 22 and the lower sides of U-shaped frames 1.

It will now be described the embodiment of FIGS. 9, 10, 11, 12, 13 and 14 showing a refrigerator differing from that initially described in having two separate preservation chambers, indicated at 120 and 121, designed to reach temperatures different from one another. For indicating like or similar elements, the same reference numerals will be used for this embodiment as adopted for the first embodiment, except for the addition of letter $a$ and an apex to avoid repetition; the description will be brief as to the already known elements, while being more detailed for the novel elements.

The structure still provides the two frames 1a defining the side panels wherein the plastic laminate panels 4 and rearwardly the metal panel 8 are insertable.

Cross-pieces 42a, 56a and 69a extend between said two frames. A plate base 23a, fully identical to base 23, is provided. A plate member 60a, substantially equivalent to member 60, is also provided. The lower and side edges of this plate member are inserted in cross-piece 42a and front uprights of frames 1a, while the upper edge 54a is inserted (see FIG. 11) in a cross-piece 131 formed of a metal section 132, the opposite sides or ends of which are threaded within narrow mouth channels or grooves 133 and 134, respectively; channel 133 being provided in a plastic section 135 having a broken extension and being provided with a flange 136 which is secured to the end 54a of member 60a by means of screws. Thus a chamber 600 is obtained in which and prior to injection a shaped body of foamed material and corresponding shape is accommodated. Groove 134 pertains to the lower side of a plastic molded frame 50a corresponding, as to function thereof, to frame 50 of FIGS. 1 and 2. At its ends, this lower side of frame 50a has grooves 601 and 602 wherein the edge 54a of member 60a and the lower edge of a shaped plate member 140 are inserted, respectively.

Plate member 140 has a contour plate 151 extending on three sides, a bottom 152 and an upper wall 153. These walls are joined to one another by edge overlapping and distortion at discrete locations, that is similarly to the description in connection with members 23, 60 and 60a. Except for the flat configuration of bottom wall 152, member 140 corresponds to member 60 of FIGS. 1 and 2 also as to the application of coil 90a involving the upper surface as well as the other sides of member 140.

Between members 140 and 60a there is a gap, into which the foamed material will penetrate thermally insulating and joining said members 60a and 140 to each other.

In order to maintain a proper spacing in gap 170 spacing blocks of the same material as the foamed material are introduced, or tie rods (not shown) can be used, such tie rods enclosing member 140 and terminating with enlarged ends in the grooves of sections 1a.

Member 60a is retained to the front uprights of frames 1a by means of bands 173, such as resilient bands, at the ends thereof being provided with enlargements designed to be accommodated within the intermediate groove of sections 1a, which groove in FIG. 5 is indicated at 1b.

Chamber 120, as defined by member 60a, is designed to be held at a higher temperature than chamber 121 and has a cooling coil 174a extending only along the rear wall of the member, as shown by broken lines. The other sides of member 60a are free. At the top the structure is closed by a cover member corresponding to cover 41 of FIG. 8, reference being made therefore thereto for a more detailed description.

On the inclined wall 25a of member 60a an aperture 175a is formed. In this aperture there is inserted a tubular extension 176 provided at the lowermost location of a collecting member or gutter 175 which is applied to the rear wall of member 60a, such as by screws.

The bottom faces 178 and 179 of the gutter are converging to said extension 176. Substantially, the gutter will define with the rear wall of member 60a a channel 180 (FIG. 14) at the bottom terminating with a flat flange 181 which is secured to wall 177 by means of screws. The channel has two converging portions defined by surfaces 178 and 179. Water, if any, will drain and be collected within channel 180, and reaches the outside through the tubular extension 176 (which passes through an aperture 175a of wall 25a) and a conduit connected to said extension. Water may be collected within a basin (not shown) in the chamber where the engine-compressor is located.

Figure 2:
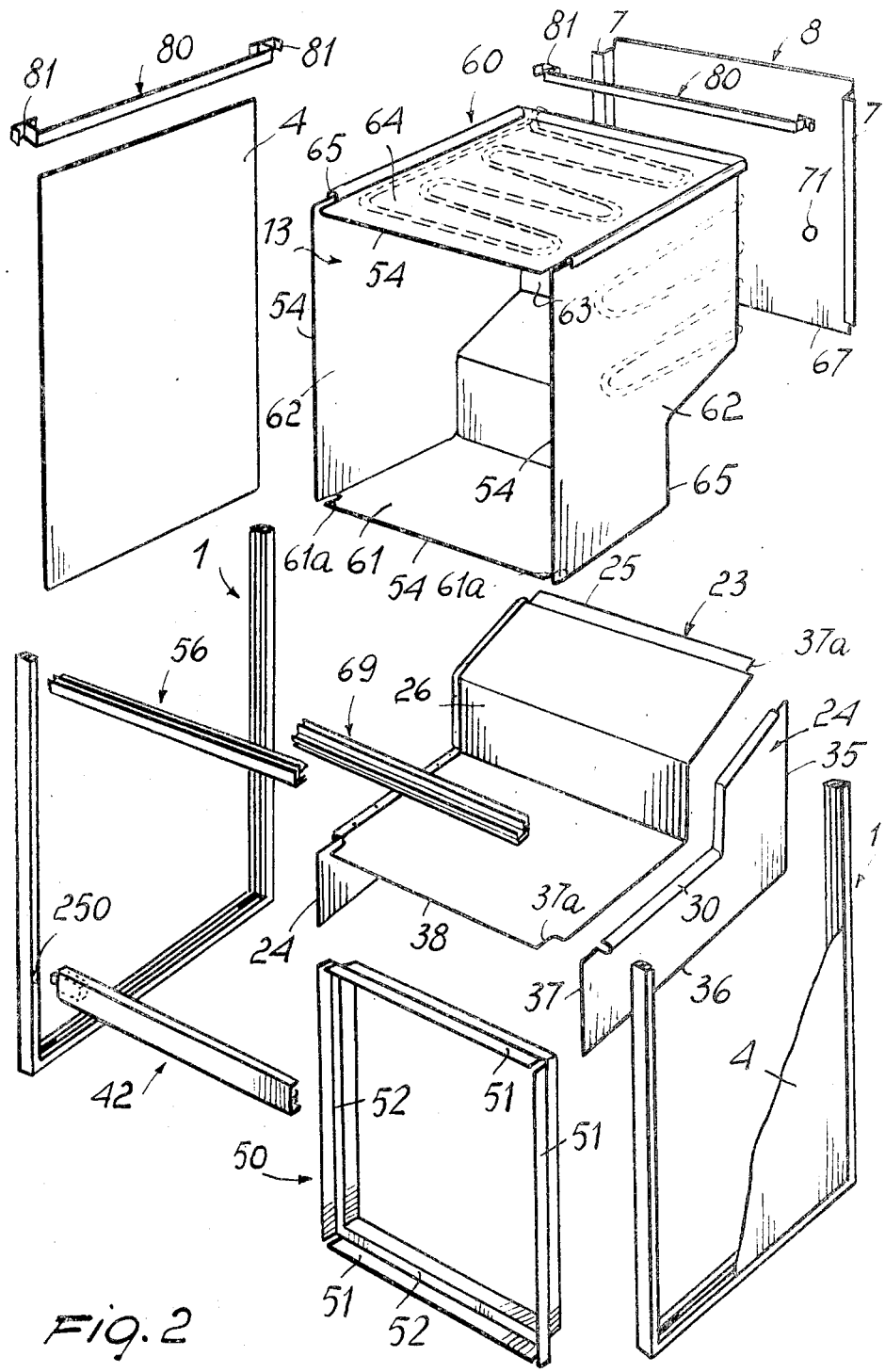
FIG. 2 is a perspective exploded view of the refrigerating cabinet shown in FIG. 1.
Figure 6:
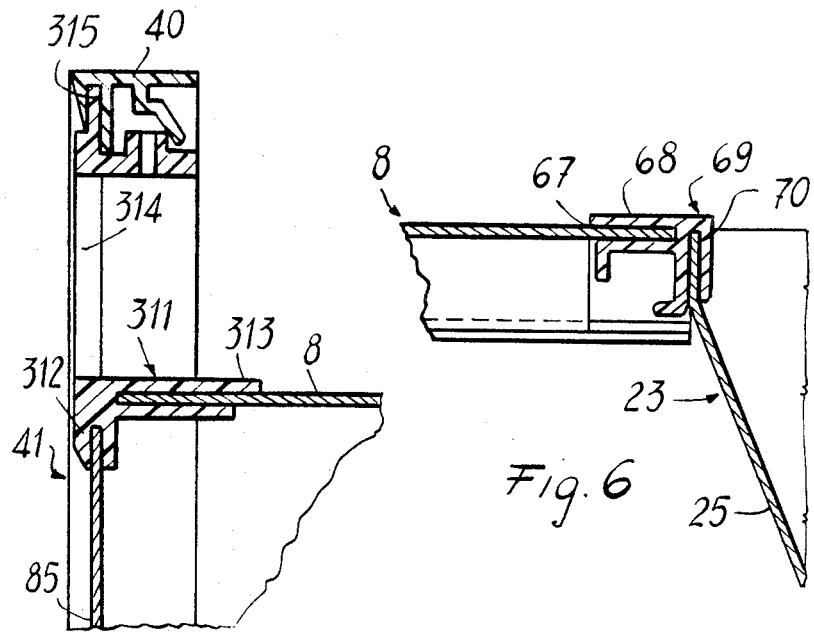
FIG. 6 is a sectional view taken on line VI—VI of FIG. 5.

In connection with this embodiment, it will now be described how the door 200 for the refrigerating cabinet is provided, it being understood that such a construction can be adopted for the door of the refrigerating cabinet of FIGS. 1 and 2, as well as to close chamber 121.

Along its periphery, door 200 (see FIGS. 9, 10 and 12) is defined by a section 201 which on the front, that is to the outside, has a narrow mouth channel 202, in which the contour of a plate 203 of plastic laminate or sheet, glass or the like, is inserted, such a plate forming the external face for the door. Section 201 can be made of plastic material with or without an incorporated metal core; it has a further groove 204 in which the deformable head 205 of a seal is forced, said seal being indicated as a whole at 206 and incorporating at 209 a magnetic rubber bar. The seal is per se already known and is no matter for the present invention, whereby a further detailed description thereof is to be deemed as useless.

Section 201 has a further groove 210, parallel to groove 202, in which the contour of a plate 211 is inserted. Said plate 211 is preferably made of plastic laminate, sheet or the like and at a not shown position is provided with an aperture for allowing the injection of the foamable resin mixture into the gap externally defined by the contour section 201 and plastic laminate plates 203 and 211.

Section 201 has a fourth groove 213 in which a so-called "counter-door" 215 is in a trip engagement relationship, said counter-door 215 being made of plastic material by known techniques of vacuum molding from a sheet. It is significant to note that in accordance with the invention the contour of said counter-door 215 is resilient. For the purpose, it is attached to the remainder of the counter-door through a set of steps and bendings. More particularly, said flange or contour 214 is at the end provided with a step 216 cantilever projecting beyond the median face 217 of the counter-door, being joined thereto through a bending area 218. Thus, following the injection and setting of the foamed material firmly joining the panels 203, 211 and section 201 to one another, by a simple elastic deformation of the counter-door flange or contour, the latter can be forced in groove 213 of section 201, which renders substantially unnecessary the use of other means for securing the counter-door to the carrying structure for door 200.

At two opposite sides (upper and lower sides) there is inserted in the intermediate chamber 220 of section 201 a section length 221 which is embedded in the foamed material. This metal insert 221 is for affording a housing for the hinge pins of the door. The lower hinge, which is secured either to cross-piece 42a or to the front upright of frame 1a according to conventional processes and means, has not been shown as being of a usual type; however, it has a pin designed to accommodate within a plastic cup, inserted in a hole passing through section 201, the insert 221 and is driven into the foamed material. A conceptually corresponding approach is illustrated in FIG. 12 showing the intermediate hinge 232. In this figure, the cup and hole are indicated at 230 and 231, respectively. The intermediate hinge 232 carries the pivoting or hinging pin both for the top door (closing chamber 121) and for the bottom door 200 (closing chamber 120). Hinge 232 comprises a plate 233 which is secured to the front upright of frame 1a by means of screws 234. Plate 233 has a cantilever arranged, horizontally bent lug 236, at the top and at the bottom there being secured thereto in alignment to one another the rounded head pins 235 forming the axes of rotation for the hinges. The lower pin 235 will seat in cup 231 previously (and forcibly) introduced into hole 230 in section 231 and insert 221.

As to the upper hinging of the door closing the chamber 121, because of its conventionality a description thereof is to be herein deemed as useless.

In the preceding figures it has always been contemplated that the evaporating battery was comprised of one or more coils of a semicircular cross-section (see FIG. 3) and contacting the external faces of the walls defining the preservation chambers. FIGS. 16, 17 and 18 diagrammatically show an embodiment wherein the concept of the invention is susceptible of being applied also to refrigerators of the type in which the evaporating battery comprises a cell or annular body inside the preservation chamber and secured to the walls of said chamber by screws or other suitable means.

In this case, the cabinet of the refrigerator will be made substantially as that of FIGS. 1 and 2, the only difference being in that coil 90 will be omitted and rear wall 63 will be provided with an aperture 226 aligned with a larger aperture 227 in the rear panel 8. Prior to resin injection, the gap between wall 63 and panel 8 is filled along the contour of such apertures with a frame 227 made of the same material as the foamable resin. Prior to threading of panel 8, this frame is caused to bear on the inwardly bent edges 228 of aperture 226. Following injection and resin curing, said frame 227 is entrapped within the resulting monolithic structure, thus having a through aperture 230 provided with an intermediate step 231, which aperture is not flooded by the foamed material and in which a male member on the mold (corresponding to that of FIGS. 19 and 20) is inserted during injection step, said male member having a shape corresponding to the aperture and so operating as to maintain said aperture unobstructed.

The aperture is then closed by a box 240 containing any thermally insulating material 242. The box comprises a portion 243 peripherally provided with trip teeth 244 engaging in grooves 245 at locations corresponding for the cover 246 forming the other portion of the box. At four locations said cover has resilient teeth 250 provided with lugs designed to be inserted, after having been slightly resiliently deformed, in apertures 251 in the rear wall 8 and terminating in a chamber 252 previously formed in frame 227.

In panel 8 (see FIG. 18) a slot is formed, in which there is inserted a section 261 provided with end flanges 262 which at opposite sides have grooves. The outer grooves 264 are for allowing section 261 to be threaded in the slot in wall 8, whereas the grooves at a facing position are for allowing the threading of a foil 270 closing the channel 271 where a conduit 272 passes, said conduit connecting the evaporating battery located in the inner chamber 13 of the refrigerator to the remainder of the refrigerating circuit. More particularly, conduit 272 (see FIG. 16) extends through a groove 275 of frame 227 and exits through a slot in wall 63. After arranging conduit 272 in the communicating grooves, a sealant capable of insuring a satisfactory thermal sealing is introduced thereinto for insulation purposes.

Channel 271 extends to the lower end of panel 8 and opens into the chamber wherein the engine-compressor is located, said chamber being defined by base 23.

The narrow mouth of the groove being resiliently enlargeable by elastic deformation of the material allows the various elements of the cabinet to be retained at a clamping condition, thus facilitating the assembling and transport operations prior to introduction of the foamable resin.

Although only some embodiments of the invention have been described, it will be easy now for those skilled in the art to devise many changes and modifications, all of which are however to be intended as within the scope of the present invention.

What is claimed is:

1. An insulated cabinet, such as a refrigerator cabinet, comprising edge frame sections formed with grooves, panels having edges in said grooves to form a first shell with said edge frame sections, and at least one shaped body forming a second shell defining a gap with said first shell, and a foamed material filling the gap between said panels and said body.

2. An insulated cabinet, such as a refrigerator cabinet, comprising: edge frame sections formed with parallel outer and inner grooves, panels having edges received in said outer grooves of said sections, at least edges of at least one shaped body received in said inner grooves; cross-pieces also formed of sections and interposed between said edge frame sections and provided with grooves accommodating therein further contour portions of said body; and a cover member over said frame sections and defined by a section provided with grooves in which the top edge of at least part of the panels are inserted; said body and panels defining between themselves a gap which is filled with foamed material acting as a binder for the several elements to one another, as well as an acoustic and thermal insulating means.

3. A cabinet according to claim 2, wherein there are a plurality of said shaped bodies one of which is the cabinet base and is formed of two side panels and a transverse plate element joined to one another by edging and deformation of the overlapping at discrete locations.

4. A cabinet according to claim 1 wherein a coil is arranged in contact with said body, said coil forming the evaporating battery for a refrigerating circuit and being of substantially semicircular cross-section and having a flat side adhering to walls of said body, said coil being in the foamed material.

5. A cabinet according to claim 1, wherein said body has at an inner face a water collecting gutter conveying said water to the outside by means of a channel passing through the cabinet depth.

6. A cabinet according to claim 1, including a rear wall having a through aperture designed to be intercepted by a removable insulating plug and wherein a conduit is provided in the wall depth of the refrigerating cabinet for the connection of the evaporating battery (attached by conventional means in the preservation chamber) to the remainder of the refrigerating circuit.

References Cited

UNITED STATES PATENTS

| | | | |
|---|---|---|---|
| 2,639,592 | 5/1953 | Philipp | 62—95 |
| 3,000,058 | 9/1961 | Thielen | 18—59 |
| 3,177,271 | 4/1965 | Slayman | 312—214 X |
| 3,240,029 | 3/1966 | Wurtz | 312—214 X |
| 3,241,198 | 5/1966 | Cornelius | 62—516 X |

CASMIR A. NUNBERG, Primary Examiner

U.S. Cl. X.R.

312—236